United States Patent
Hayashibara

(10) Patent No.: US 7,791,622 B2
(45) Date of Patent: Sep. 7, 2010

(54) DISPLAY OUTPUT DEVICE

(75) Inventor: Kazuki Hayashibara, Daito (JP)

(73) Assignee: Funai Electric Co., Ltd., Osaka (JP)

(*) Notice: Subject to any disclaimer, the term of this patent is extended or adjusted under 35 U.S.C. 154(b) by 568 days.

(21) Appl. No.: 11/858,572

(22) Filed: Sep. 20, 2007

(65) Prior Publication Data
US 2008/0079758 A1  Apr. 3, 2008

(30) Foreign Application Priority Data
Sep. 28, 2006  (JP) .............................. 2006-264028

(51) Int. Cl.
G09G 5/02  (2006.01)
(52) U.S. Cl. ...................... 345/699; 345/698
(58) Field of Classification Search ................ 345/1.2, 345/77, 83, 87–88, 90, 104, 212–214, 690, 345/698–699; 348/425.2–425, 441, 448–449, 348/469, 452, 458, 554–558; 382/289–300, 382/302, 305; 358/409, 449–462
See application file for complete search history.

(56) References Cited

U.S. PATENT DOCUMENTS

| | | | |
|---|---|---|---|
| 5,874,937 A * | 2/1999 | Kesatoshi | 345/428 |
| 5,940,117 A * | 8/1999 | Hassan et al. | 725/115 |
| 6,067,071 A * | 5/2000 | Kotha et al. | 345/698 |
| 6,236,388 B1 * | 5/2001 | Iida et al. | 345/698 |
| 6,342,923 B1 * | 1/2002 | Kim | 348/458 |
| 6,597,373 B1 * | 7/2003 | Singla et al. | 345/698 |
| 2005/0253827 A1 * | 11/2005 | Hung et al. | 345/204 |

FOREIGN PATENT DOCUMENTS

| | | |
|---|---|---|
| JP | 2001111914 | 4/2001 |
| JP | 2004102027 | 4/2004 |
| JP | 2004102063 | 4/2004 |
| JP | 2005167895 | 6/2005 |

* cited by examiner

*Primary Examiner*—Richard Hjerpe
*Assistant Examiner*—Mansour M Said
(74) *Attorney, Agent, or Firm*—Pillsbury Winthrop Shaw Pittman, LLP

(57) ABSTRACT

There are included a communication unit, a resolution adjustment unit, a storage unit, a video signal output unit, and a resolution information correction unit.

The communication unit requests an image display device that displays an image to transmit first resolution information specifying the resolutions at which the image display device can perform output, and receives the first resolution information. The resolution adjustment unit adjusts the resolution when outputting a video signal outputted to the image display device. The image display device and the display output device conform to a standard for transmission and reception of video signals at one predetermined resolution or more which are determined in advance. The storage unit stores the first resolution information. If the predetermined resolution determined by the standard is not included in the received first resolution information, the resolution information correction unit appends the predetermined resolution determined by the standard to the first resolution information, which it stores in the storage unit.

2 Claims, 3 Drawing Sheets

DISPLAY OUTPUT DEVICE

CROSS REFERENCE

This Nonprovisional application claims priority under 35 U.S.C. §119(a) on Patent Application No. 2006-264028 filed in Japan on Sep. 28, 2006, the entire contents of which are hereby incorporated by reference.

BACKGROUND OF THE INVENTION

A display output device which receives resolution information from an image display device, and which adjusts the resolution of a video signal which it outputs to an image display device based thereupon, has been disclosed in Japanese Laid-Open Patent Publication 2005-167895, Japanese Laid-Open Patent Publication 2004-102027, Japanese Laid-Open Patent Publication 2004-102063, Japanese Laid-Open Patent Publication 2001-111914, etc.

In Japanese Laid-Open Patent Publication 2005-167895, there is disclosed an image display device which is adapted, when an image display device and an display output device according to the HDMI standard are used, to be able to select an image format which is compatible with both of these devices, so that it is not necessary for the user to specify an image format according to which these devices can be connected together.

Here, the HDMI (High Definition Multimedia Interface) standard is a digital video and audio input and output interface standard settled upon in December 2002, and which is principally aimed at household electronics and AV devices. According to this standard, it is possible to transmit and to receive video and audio control signals together upon a single cable. And, with a device which complies with this HDMI standard, along with it being possible to transmit a video signal at 720×480 resolution, it is also possible to display an image at this resolution.

In Japanese Laid-Open Patent Publication 2004-102027, there is disclosed a structure in which, in an implementation of a multi-monitor environment with a PC, device information is transferred mutually to and fro between the image display device and the PC, in order to output an image at the optimum refresh rate. Furthermore, in Japanese Laid-Open Patent Publication 2004-102063, the concept is described of acquiring EDID (Extended Display Identification Data) information from the device on the downstream side, and of rewriting the display resolution information of the device on the upstream side.

Moreover, in Japanese Laid-Open Patent Publication 2001-111914, for a digital device which receives digital broadcasts which are broadcast in a plurality of formats and outputs a video signal to a television, in order to implement a transmitter which automatically decides whether or not some television is compatible with multiple formats, the concept is described of a structure which makes a decision upon the broadcast format from, for example, the TS (transport stream), and which controls an video signal selection means based upon the scanning frequency of the receiver, by changing over a switch so as to perform conversion, or not, based upon the value of the scanning frequency from the television which has been detected.

As described above, in the case of an image display device which complies with the HDMI standard, it must be possible to receive and to display a video signal at the resolution of 720×480. However, when a request is made by the display output device which outputs the video signal for transmission of resolution information, there are some image display devices which comply with the HDMI standard but which transmit resolution information being lack of information of 720×480. When this occurs, according to the resolution information which has been received from the image display device, the display output device may make a decision that the device cannot perform output at the resolution of 720×480. This imposes an inconvenience upon the user, which constitutes a problem. Furthermore there has been the problem that, in a case such as one in which the display output device can only perform output at the resolution of 720×480, it may not be possible to connect it with an HDMI cable but only with an analog pin cable, and product claims or customer returns are sometimes founded upon this matter.

Moreover, although in Japanese Laid-Open Patent Publication 2004-102027 the concept is described of the selection of the optimum resolution being entrusted to the user, there is the problem that, from the point of view of the user, this selection is a troublesome task. Furthermore, during this selection, there is a fear that display at a resolution of 720×480, as specified according to the standard, may not be performed, and may not be able to be selected.

Accordingly, the present invention takes it as its object to provide a display output device which is endowed with functions of receiving resolution information from an image display device which displays an image and of adjusting the resolution while outputting a video signal based thereupon, and which particularly selects the optimum resolution in a reliable manner.

SUMMARY OF THE INVENTION

The display output device of the present invention includes a communication unit, a storage unit, a video signal output unit, a resolution adjustment unit, and a resolution information correction unit.

The communication unit requests an image display device that displays an image to transmit first resolution information specifying the resolutions at which said image display device can perform output, and receives said first resolution information.

The storage unit stores said first resolution information received by said communication unit.

The video signal output unit outputs a video signal. The resolution adjustment unit adjusts the resolution of a video signal outputted to said image display device.

The image display device and said display output device conform to a standard for transmission and reception of video signals at one predetermined resolution or more which are determined in advance.

The resolution information correction unit: if said predetermined resolution determined by said standard is not included in said first resolution information which has been received, appends said predetermined resolution determined by said standard to said first resolution information, which it stores in said storage unit; and, if said predetermined resolution determined by said standard is included in said first resolution information which has been received, does not append said predetermined resolution determined by said standard to said first resolution information.

And the resolution adjustment unit selects an optimum resolution based upon said first resolution information which has been processed by said resolution information correction unit, and adjusts the resolution of said video signal to this optimum resolution.

DETAILED DESCRIPTION OF THE INVENTION

Figure 1:
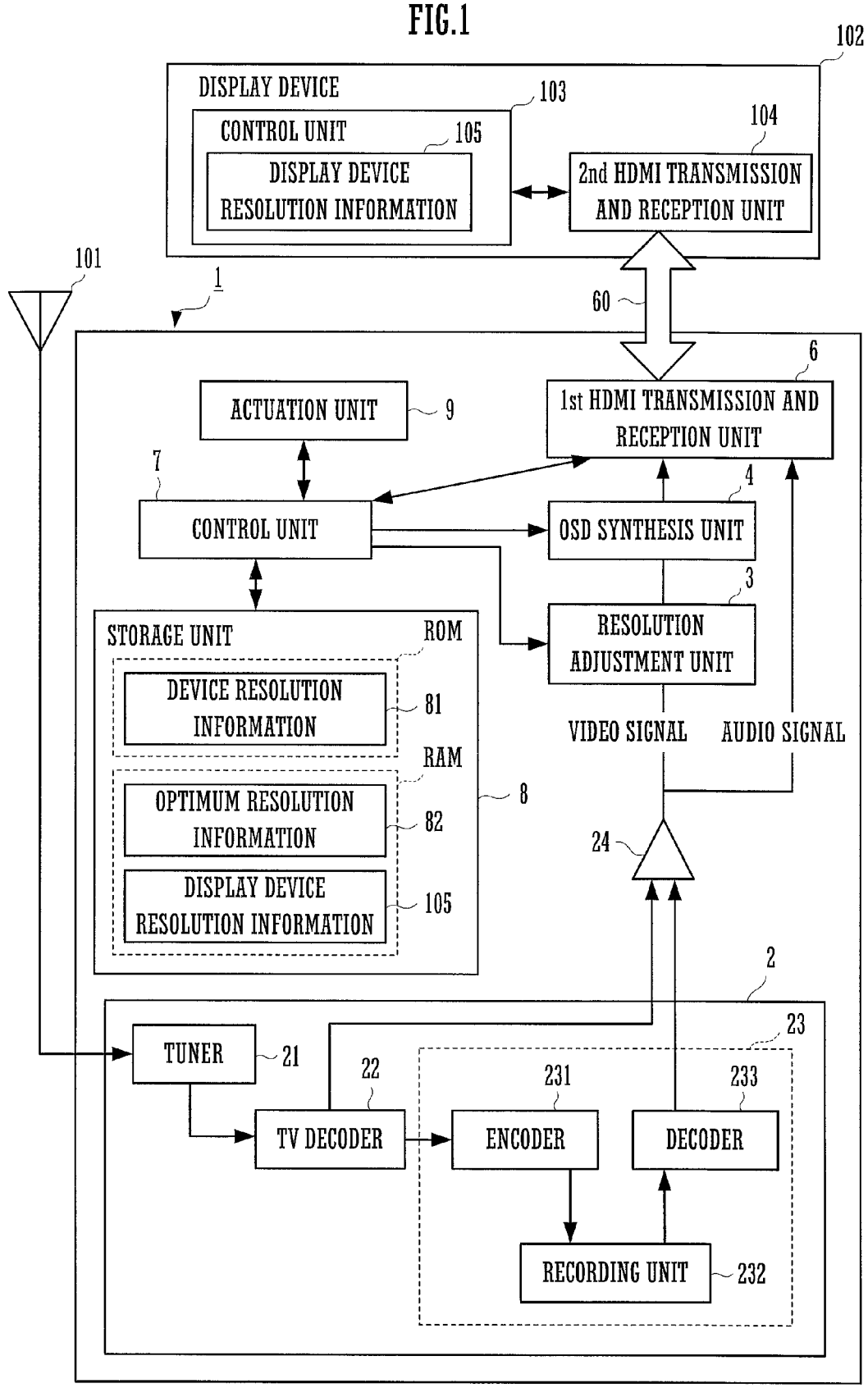
FIG. 1 is a structural diagram of a digital broadcast reception and image recording device which is a first embodiment of the present invention.

The display output device of the present invention comprises a video signal output unit 2, an OSD (On-Screen Display) synthesis unit 4, an first HDMI transmission and reception unit 6, a control unit 7, a storage unit 8, and an actuation unit 9.

The first HDMI transmission and reception unit 6 performs transmission to an external display device 102, and reception therefrom, in conformity with the HDMI standard. Furthermore this display device 102, which displays a video signal outputted from the HDMI transmission and reception unit 2, is provided external to a digital broadcast image recording device 1.

The video signal output unit 2 outputs a video signal. This video signal output unit 2 comprises a tuner unit 21, a TV decoder 22, an image recording unit 23, and a selector 24.

The tuner unit 21 comprises a tuner, a demodulation circuit, an error correction circuit, a separation circuit, a demultiplexer, and a buffer memory, and outputs a TS (transport stream). The tuner extracts a broadcast signal upon a channel which is specified by the control unit 7, and outputs it to the demodulation circuit. The demodulation circuit demodulates this broadcast signal which is inputted, and outputs it to the error correction circuit. The error correction circuit corrects erroneous information in the TS (transport stream) which has been inputted. And the separation circuit separates the TS from the signal outputted from the error correction circuit, and outputs it.

The TV decoder 22 comprises a demultiplexer and a decoder. In the TS, along with programs upon a plurality of virtual channels being transmitted as multiplexed, also information about the virtual channel numbers is included. The demultiplexer extracts the packets for a single channel from these virtual channels, and outputs them to the control unit 7. Upon receipt of commands or permission from the control unit 7, a buffer memory within the tuner unit 21 reads out stored data as appropriate. And the video data and the audio data are separated from this data which has been read out, and both these data streams are expanded and outputted. And the TV decoder 22 outputs the video data and the audio data to the selector 24 and to an image recording unit 23.

The image recording unit 23 comprises an encoder 231, a recording unit 232, a decoder 233, and a timer not shown in the figures. According to this structure, the image recording unit 23 records the video signal and the audio signal from the TV decoder 22 during a time slot which is set by an image recording scheduling program (not shown in the figures) of the control unit 7.

The encoder 231 encodes the video signal and the audio signal which are outputted from the TV decoder 22 in, for example, the MPEG format.

The recording unit 232 comprises a recording medium (which may include a fixed medium as well as a removable one) and a recording and reading unit which performs recording upon this recording medium and reading out therefrom. By doing this, the recording unit 232 records the video signal and the audio signal which have been encoded by the encoder 231. The recording medium may be, for example, a CD, a DVD, a hard disk, a video tape, or the like, and may be of any type, provided that it is one upon which an video signal can be recorded. However, if an analog video signal is replayed and outputted from the recording unit 232, then an A/D converter should be provided, instead of the decoder 233. If for example the recording medium is a DVD, then the recording and reading unit which reads out from the storage medium of the recording unit 232 may be an optical pickup. The decoder 233 decodes the video signal which has been read out by the recording unit 232.

The selector 24 is endowed with a function of changing over two signals simultaneously. According to this structure, the selector selects the video signal and the audio signal of either the TV decoder 22 or the decoder 233. When the image recording unit 3 is replaying a video file, then input of the video signal and the audio signal of the decoder 33 is selected; while, when replay is not being performed, then input of the video signal and the audio signal of the TV decoder 22 is selected. The selector 24 outputs its video output to the resolution adjustment unit, and outputs its audio signal to the first HDMI transmission and reception unit 6.

Upon receipt of a command from the control unit 7, by a per se known method, the resolution adjustment unit 3 adjusts the resolution of the video signal which it outputs to the display device 102, and changes the format thereof. If the output which has been commanded by the control unit 7 is higher than the output of the video signal output unit 2, then the resolution adjustment unit 3 interpolates the moving image and smoothes it. Conversely, if the output which has been commanded by the control unit 7 is lower than the output of the video signal output unit 2, then the resolution adjustment unit 3 compresses the moving image.

The OSD synthesis unit 4 comprises an OSD image memory, and, based upon a control signal which is supplied from the control unit 7, this OSD synthesis unit 4 creates a video signal for an OSD of a character or a drawing which is stored in this OSD image memory, and outputs this video signal. Furthermore, if a video signal is being outputted from the selector 24, the OSD synthesis unit 4 combines its own video signal therewith.

The first HDMI transmission and reception unit 6 outputs the video signal which has been outputted from the OSD synthesis unit 4 and the audio signal which is the output of the selector 24, and outputs the result to the second HDMI transmission and reception unit 104 of the display device 102. Furthermore, the first HDMI transmission and reception unit 6 communicates with the display device 102 and acquires from the control unit 102 of the display device 102 display device resolution information 105, which is a list of information as to the resolutions at which this display device 102 can perform display, and outputs this display device resolution information 105 to the control unit 7; and the control unit 7 stores this display device resolution information 105 in the storage unit 8. The method by which this display device resolution information is thus acquired will be described hereinafter. In other words, the control unit 7 outputs a request for information transmission to the control unit 103 of the display device 102 via the first HDMI transmission and reception unit 6. In response, the control unit 103 of the display device 102 transmits the display device resolution information 105 via the second HDMI transmission and reception unit 104.

The control unit 7 comprises a CPU and the like, and controls the various sections within the digital broadcast image recording device 1. For example, it controls the video signal output unit 2, changing over of the selector 24, the timing of recording by the recording unit 32, the resolution of the video output to the display device 102, and the like. Furthermore, the control unit 7 communicates with the display device 102 via the first HDMI transmission and reception unit 6, and issues a command for storage of the display device resolution information 105 in the storage unit 8. Moreover, the control unit 7 determines optimum resolution information 82, which consists of candidate resolutions at which output to the display device 102 can be performed.

The storage unit 8 comprises a ROM within the control unit 7 which stores sub-programs and control information, and a RAM which temporarily stores results of calculations by the control unit 7, and stores the control information for the control unit 7. Within this ROM, there is stored device resolution information which specifies a list of the resolutions at which this digital broadcast image recording device 1 can output video signals. And, within the RAM, there are stored the display device resolution information 105 which has been stored by communication with the display device 102, and the optimum resolution information 82 which has been determined by the control unit 7.

The actuation unit 9 comprises actuation members which are fitted to the digital broadcast image recording device 1, a remote control, and a remote control light reception unit which receives an infra-red signal from this remote control, none of these elements being specifically shown in the figures. This actuation unit 9 receives control input for actuation of the control unit 7. When an actuation member of the digital broadcast image recording device 1 or of the remote control is depressed, a predetermined control input is inputted.

The display device 102 comprises the control unit 103, the second HDMI transmission and reception unit 104, and a liquid crystal panel not shown in the figures. This display device 102 inputs the video signal and the audio signal which are outputted from the digital broadcast image recording device 1, and outputs video and audio. The control unit 103 comprises a ROM and a RAM which store control information, and controls the various sections of the display device 102. This ROM stores the display device resolution information 105, which specifies a list of the resolutions at which the display device 102 can perform display.

The second HDMI transmission and reception unit 104 is a transmission and reception unit for transmitting and receiving data to and from the digital broadcast image recording device 1. This second HDMI transmission and reception unit 104 not only receives a video signal and so on, but also transmits the display device resolution information 105. When a request for transmission of the display device resolution information 105 has been received from the first HDMI transmission and reception unit 6, the second HDMI transmission and reception unit 104 transmits this request to the control unit 103. And the control unit 103 transmits the display device resolution information 105 to the digital broadcast image recording device 1 via the second HDMI transmission and reception unit 104.

It should be understood that the video signal output unit 2 corresponds to the "video signal output unit" of the Claims. This video signal output unit 2 is not limited to being of the type shown in FIG. 1; it could be of any kind, provided that it outputs a video signal. It would also be acceptable for it to be a device which outputs a portion of the audio of the video signal output unit 2 shown in FIG. 2, or to be a device which converts an analog video signal, for example the output of a tuner of a television receiver, into digital form and outputs it, or to be an output of a personal computer. It would also be acceptable for it to be a terminal at which a video signal is inputted from the exterior. Any of these may correspond to the "video signal output unit" of the Claims. Furthermore, it would also be acceptable to structure the selector 24 as two physically separate selectors, one for the video signal and one for the audio signal.

The display device 102 corresponds to the "image display device" of the Claims.

Next, the processing for setting the optimum resolution of the digital broadcast image recording device 1 will be explained with reference to the flow chart of FIG. 2. The control unit 7 is the device which performs this processing, and it does so by communicating with the display device 102 via the First HDMI transmission and reception unit 6, and by commanding the resolution adjustment unit 3 to set the optimum resolution.

In a step ST1, a request is made via the first HDMI transmission and reception unit 6 to the display device 102 to transmit the display device resolution information 105 to the digital broadcast image recording device 1.

In a step ST2, if the display device 102 has transmitted the display device resolution information 105 according to a request from the digital broadcast image recording device 1, then this is received.

In a step ST3, the display device resolution information 105 is stored in the RAM of the storage unit 8.

In a step ST4, a decision is made as to whether or not the display device resolution information 105 is improper. Here, by the display device information 105 being improper, is meant that resolution information for the resolution of 720×480 in the HDMI standard has not been transmitted from the display device 102. Here, in the case of a device which conforms to the HDMI standard, it must be capable of transmitting a video signal at the resolution of 720×480, or of receiving and displaying such a signal. However, sometimes a display device 102 upon the reception side does not transmit this information relating to resolution, and in this case it is considered that the display device resolution information 105 is improper. Supposing that the control unit 7 determines upon the optimum resolution information 82 based upon this type of information which is missing: then the digital broadcast image recording device 1 will not be able to perform output at this resolution. Accordingly, it is decided that this display device resolution information 105 is improper.

If the control unit 7 has decided that the display device resolution information 105 is improper (YES in the step ST4), then in a step ST5 information specifying the resolution of 720×480 is appended to the display device resolution information 105 stored in the storage unit 8. On the other hand, if the control unit 7 has decided that the display device resolution information 105 is not improper, in other words that information specifying the resolution of 720×480 is included in the display device resolution information 105 (NO in the step ST4), then this type of appending is not performed, and the flow of control is transferred to a step ST6, skipping the step ST5. In the step ST6, the control unit 7 refers to the display device resolution information 105 in the RAM of the storage unit 8 (including the appended information, if any information was appended in the step ST5) and to the device resolution information 81 in the RAM of the storage unit 8, selects the resolution information in them which is in agreement, and stores this resolution information in the RAM as the optimum resolution information 82.

Finally, in a step ST7, the control unit 7 selects the highest resolution from among this optimum resolution information 82 which has been stored in the step ST6, and commands the resolution adjustment unit 3 to provide this resolution. Due to this, the user need not be conscious of the resolutions of the digital broadcast image recording device 1 and the display device 102, and can set the optimum resolution by simply connecting them together.

Next, an embodiment in which the flow of processing is different from that shown in the flow chart of FIG. 2 will be explained with reference to FIG. 3. In this embodiment, the processing of the final step ST7 is replaced by the processing of a step ST17. Since the processing is the same apart from this, the above explanation thereof applies. In the step ST17, the optimum resolution information 82 which has been selected as candidate resolutions in the step ST6 is outputted as an OSD, and the user is invited to make a selection from among these candidate resolutions. For example, the one among the candidate resolutions which is being selected may be displayed as highlighted, the highlighted display among these candidates may be shifted with the cursor key of the remote control, and selection of the candidate which is displayed as highlighted may be accepted upon depression of a predetermined confirmation button (not shown in the figures). In this case, it would be acceptable to arrange for the initial position of the highlighted display to be upon the highest resolution among the optimum resolution information 82. If this is done, the user can select this highest resolution simply by pressing the confirmation button once.

The foregoing explanation of the above described embodiments will now be supplemented as follows.

The display device resolution information 105 corresponds to the "first resolution information" of the Claims. And the device resolution information 81 corresponds to the "second resolution information" of the Claims. And the operation of the control unit 7 in the steps ST4 and ST5 of FIGS. 2 and 3 corresponds to the "resolution information correction unit" of the Claims.

Figure 2:
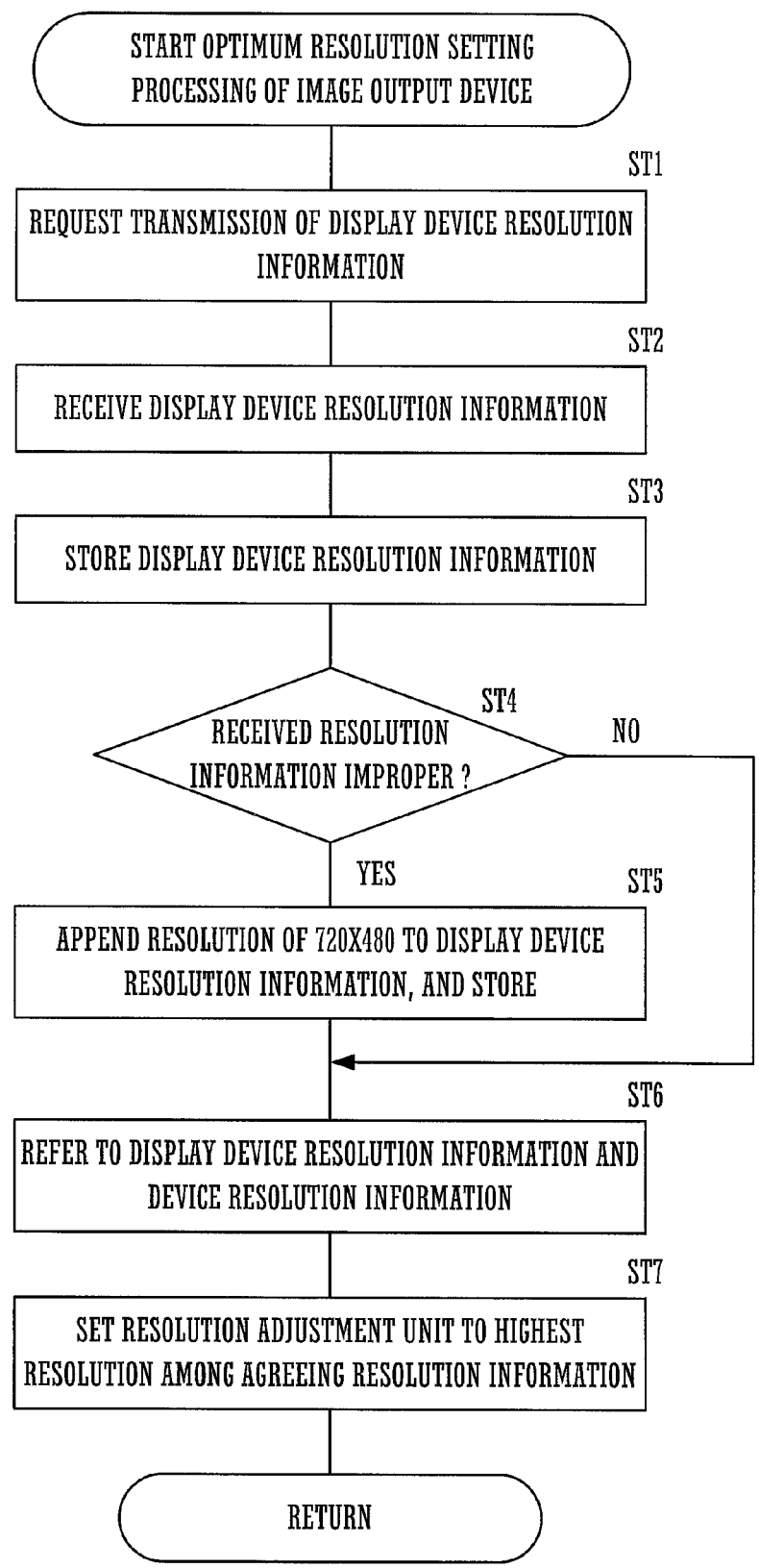
FIG. 2 is a flow chart showing processing for setting the optimum resolution.
Figure 3:
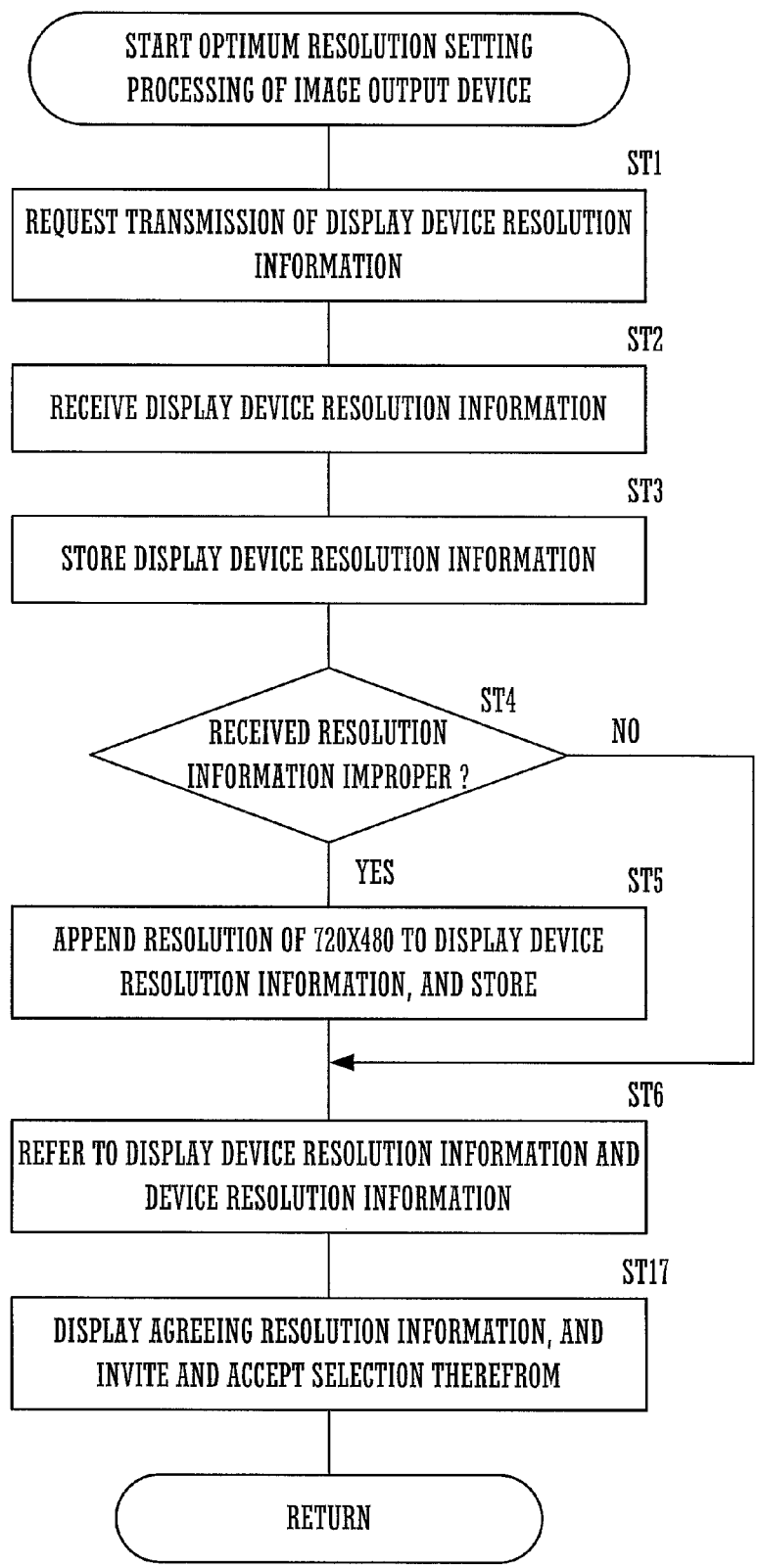
FIG. 3 is a flow chart for a different embodiment from that of FIG. 2.

In the flow chart of FIG. 2 it is not necessary to receive any selection from the user, since the single resolution which is the highest is simply selected from among the optimum resolution information 82. Accordingly no output of any OSD is required for selecting this highest resolution, and so it is not absolutely necessary to provide the OSD synthesis unit 4. On the other hand, in the embodiment described in the flow chart of FIG. 2, it is necessary to output an OSD upon the display device 102, since it is necessary to invite the user to make a selection from among the available candidate display resolutions, and to receive this selection.

Furthermore, the present invention is not to be considered as being limited to the case of the HDMI standard; the processing of these embodiments as described with reference to FIGS. 2 and 3 may be applied, provided that it is possible to transmit the display device resolution information 105, and provided that transmission and reception at a standard predetermined resolution are determined upon.

Moreover, the storage unit 7 may be one which is interior to a microcomputer which is included in the control unit; or it would also be acceptable for it to be one which is connected as shown in FIG. 1.

Yet further, the resolution of 720×480 shown for the step ST5 is only an example; some other resolution would also be acceptable.

What is claimed is:

1. A display output device, comprising:
    a communication unit which requests an image display device that displays an image to transmit first resolution information specifying the resolutions at which said image display device can perform output, and which receives said first resolution information;
    a storage unit which stores said first resolution information received by said communication unit;
    a video signal output unit which outputs a video signal; and
    a resolution adjustment unit which adjusts the resolution of a video signal outputted to said image display device;
    wherein said image display device and said display output device conform to a standard for transmission and reception of video signals at one predetermined resolution or more which are determined in advance;
    and further comprising a resolution information correction unit which: if said predetermined resolution determined by said standard is not included in said first resolution information which has been received, appends said predetermined resolution determined by said standard to said first resolution information, which it stores in said storage unit; and, if said predetermined resolution determined by said standard is included in said first resolution information which has been received, does not append said predetermined resolution determined by said standard to said first resolution information;
    and wherein said resolution adjustment unit selects an optimum resolution based upon said first resolution information which has been processed by said resolution information correction unit, and adjusts the resolution of said video signal to this optimum resolution.

2. A display output device according to claim 1, wherein said resolution adjustment unit refers to said first resolution information which has been processed by said resolution information correction unit, and to second resolution information specifying the resolutions which can be outputted by the display output device main body, and selects, as said optimum resolution, the highest resolution from among the resolutions specified by this first resolution information and second resolution information which agree with one another.

* * * * *